United States Patent
Becker et al.

(10) Patent No.: US 6,461,024 B1
(45) Date of Patent: Oct. 8, 2002

(54) READING LIGHT FOR A VEHICLE INTERIOR

(75) Inventors: Stefan Becker, Geseke; Andre Hessling-Von Heimendahl; Rico Schulz, both of Lippstadt, all of (DE)

(73) Assignee: Hella Aerospace GmbH, Lippstadt (DE)

( * ) Notice: Subject to any disclaimer, the term of this patent is extended or adjusted under 35 U.S.C. 154(b) by 0 days.

(21) Appl. No.: 09/739,120

(22) Filed: Dec. 19, 2000

(30) Foreign Application Priority Data

Sep. 20, 2000 (DE) .......................... 100 46 840

(51) Int. Cl.[7] ................................ F21V 5/00
(52) U.S. Cl. ................. 362/331; 362/187; 362/188; 362/226; 362/335; 362/521; 362/545; 362/470; 362/490
(58) Field of Search ................. 362/490, 479, 362/483, 545, 521, 522, 226, 800, 98, 335, 336, 187, 188

(56) References Cited

U.S. PATENT DOCUMENTS

| 4,530,040 A | * | 7/1985 | Petterson ............... 362/188 |
| 5,594,433 A | * | 1/1997 | Terlep ................. 340/908.1 |
| 6,132,072 A | * | 10/2000 | Turnbull et al. ........... 362/545 |
| 6,161,654 A | * | 12/2000 | Sirigu ................. 187/391 |
| 6,290,368 B1 | * | 9/2001 | Lehrer ................. 362/187 |

FOREIGN PATENT DOCUMENTS

DE        2507857        2/1975

* cited by examiner

Primary Examiner—Sandra O'Shea
Assistant Examiner—Guiyoung Lee
(74) Attorney, Agent, or Firm—Birch, Stewart, Kolasch & Birch, LLP

(57) ABSTRACT

A reading light for a vehicle interior having a light source arranged in a light fixture housing and a lens covering the housing opening and placed in front of the light source in the direction of its light emission. The reading light system includes a second lens and a first lens between the light source and the second lens.

12 Claims, 5 Drawing Sheets

READING LIGHT FOR A VEHICLE INTERIOR

BACKGROUND OF THE INVENTION

1. Field of the Invention

This present invention relates to a reading light for a vehicle interior. In particular, a reading light having a light source arranged in a light fixture housing, which includes a lens disposed in front of the light emitting direction of the light source.

2. Related Art

German Patent Application 25 07 857 A1 describes a reading light or a seat light for use with vehicles. The reading light includes a light fixture housing that includes a spherical light fixture body pivotally mounted in a receptacle in the light fixture housing. The light fixture body has an incandescent lamp or bulb light source that is surrounded by a reflector. A lens covers an opening in the light fixture housing and is positioned such that it receives light directly emitted from the light source.

A disadvantage of known reading light designs is that they are not suitable for light sources having a small beam width or spread factor; for example, light-emitting diodes. Another disadvantage of known reading light designs is that they are not suitable for producing a beam of light having a small beam width because the structural depth of the prior related art reading light devices is too great.

SUMMARY OF THE INVENTION

An object of the present invention is to provide a reading light structure capable of using light-emitting diodes as a light source and which produces a small or narrow beam of light.

This object and other objects of the present invention are achieved by providing a reading light, including a light source arranged in a light fixture housing, a second lens placed in front of the light source in the direction of light emission, and a first lens positioned between the light source and the second lens.

Due to the use of a lens system including a first lens and a second lens, even light sources having a relatively small beam width may be used. Moreover, the lens system may be constructed with a relatively small structural depth. In addition, the lens system according to the present invention provides a homogeneous plane of illumination. When using light-emitting diodes having arrays of individual so-called dies, the dies are not imaged sharply in the illumination plane which, would lead to a non-homogeneous light distribution in the illumination plane.

According to a preferred embodiment of the present invention, the light source is a light-emitting diode arranged at the focal point of the first lens, which is designed as a convergent lens. The first lens is in turn arranged at the focal point of the second lens. The first lens and a holder thereof form the orifice or aperture lens, and the second lens and a holder thereof form the field lens. This arrangement leads to a uniform light distribution or light intensity over an illuminated area.

According to another preferred embodiment of the present invention, the light source or the light-emitting diode is arranged between the focal point of the first lens and the first lens.

Therefore, because the focal point of the first lens is arranged behind the light-emitting diode or the stop plane, a compact reading light having a very small structural depth may be realized. The arrangement of the focal point behind the plane of the orifice also leads to a virtual object plane, with the result that the beam aperture or light panel may be increased in size, which in turn leads to an increase in efficiency of the light system. The light distribution of the illuminated area may therefore have its maximum at the center and decreases toward an edge thereof.

According to another preferred embodiment of the present invention, the second lens is designed as a Fresnel lens. Due to the use of a Fresnel lens, a uniform light intensity of the illuminated area can be achieved. It is also possible to design the second lens as a biconvex lens.

Due to the use of light-emitting diodes as the light source, a long lifetime of the light source with a low electric power can be achieved. Furthermore, when using light-emitting diodes, a small light outlet area can be implemented.

According to another preferred embodiment of the present invention, the light-emitting diode has a light fixture housing with two pins or two terminals as electric contacts, which may receive a plug that supplies electrical connectivity.

Accordingly, since the pins or terminals are used for receiving electricity, supplying electrical power by means of a plug is greatly simplified.

According to another preferred embodiment of the present invention, the plug for contacting the light-emitting diode also seals the light fixture housing on its rear side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
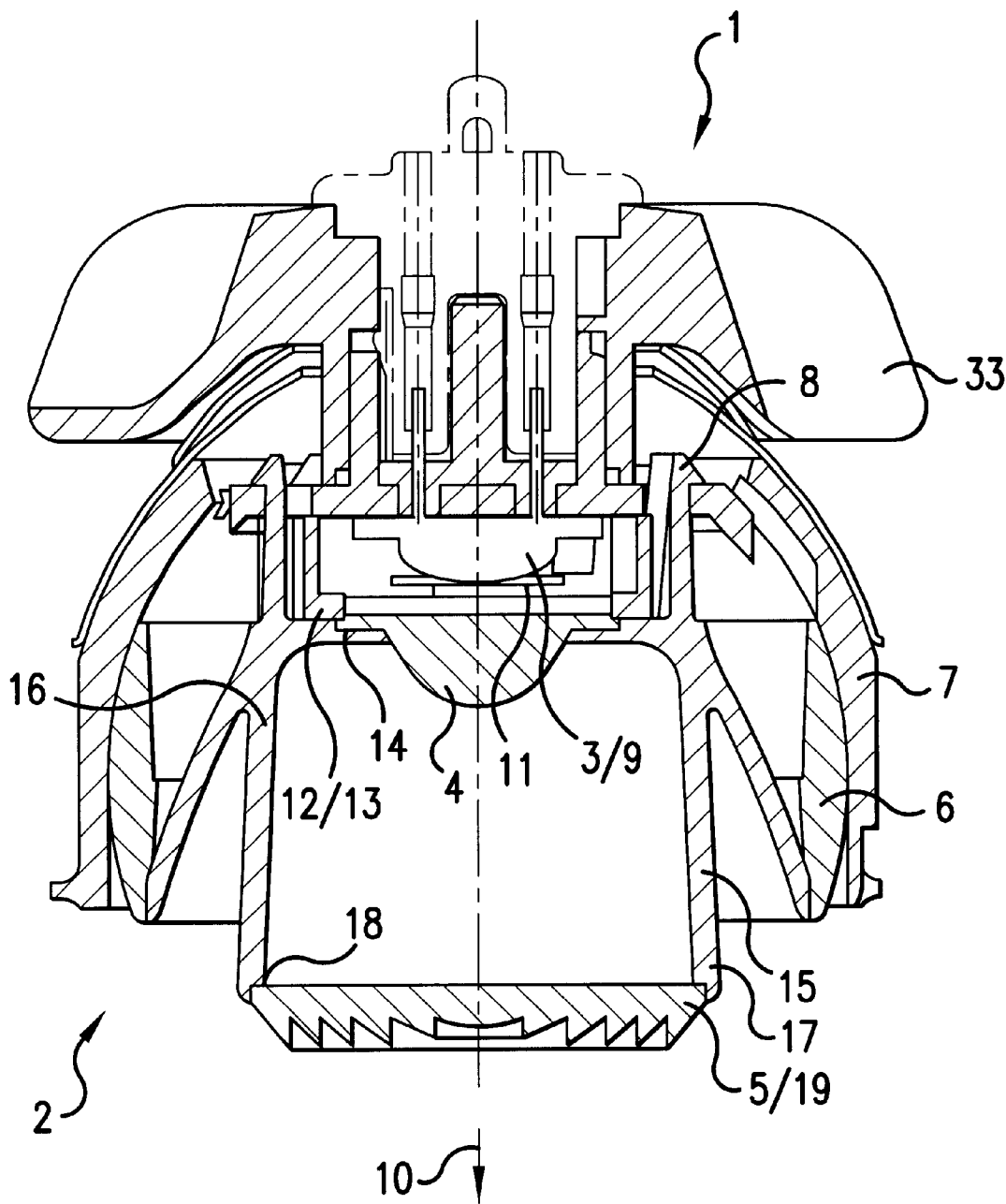
FIG. 1 illustrates a cross-sectional view of a reading light according to the present invention having the Fresnel lens as the second lens.
Figure 2:
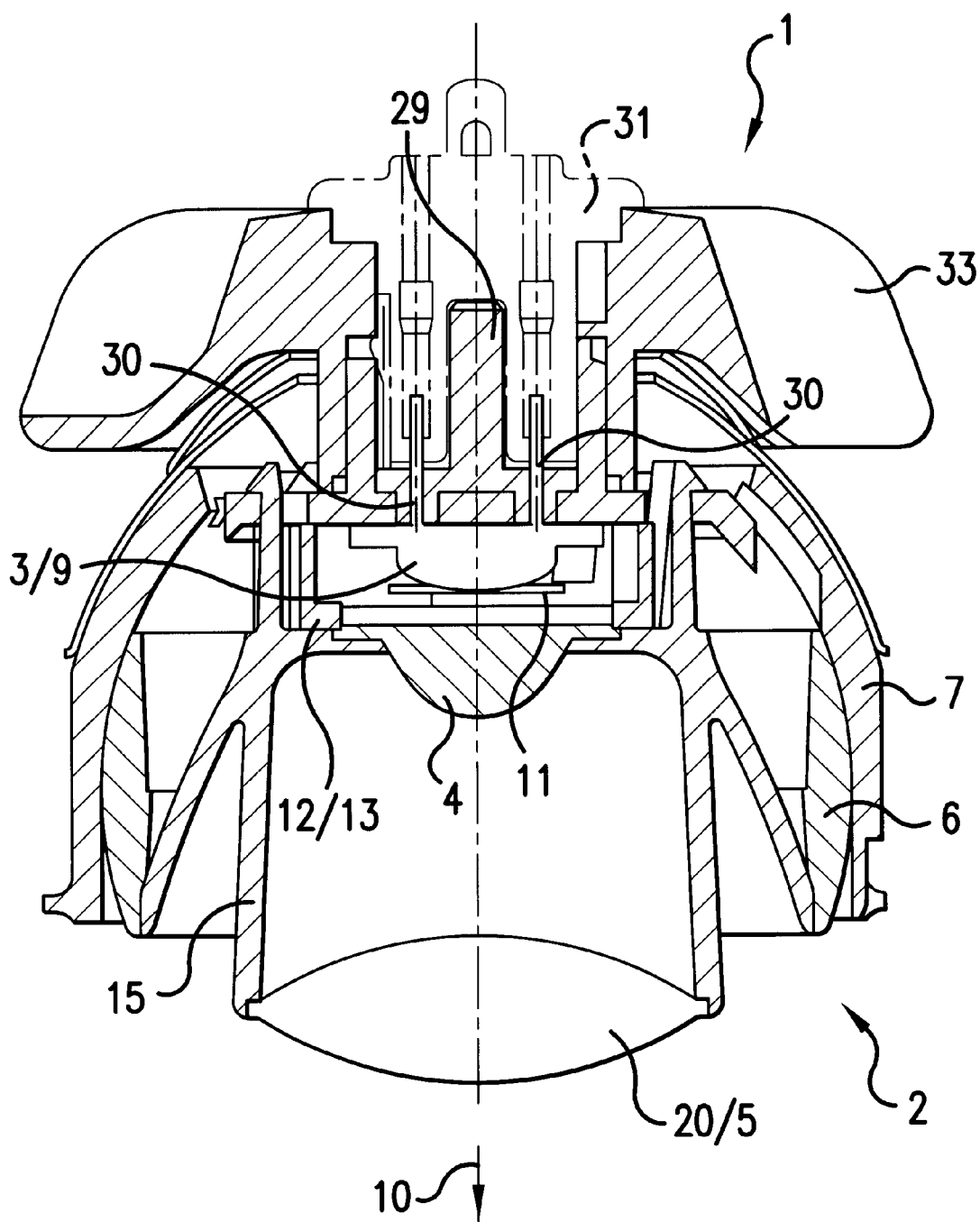
FIG. 2 illustrates a cross-sectional view of a reading light according to the present invention having a biconvex lens as the second lens.
Figure 3:
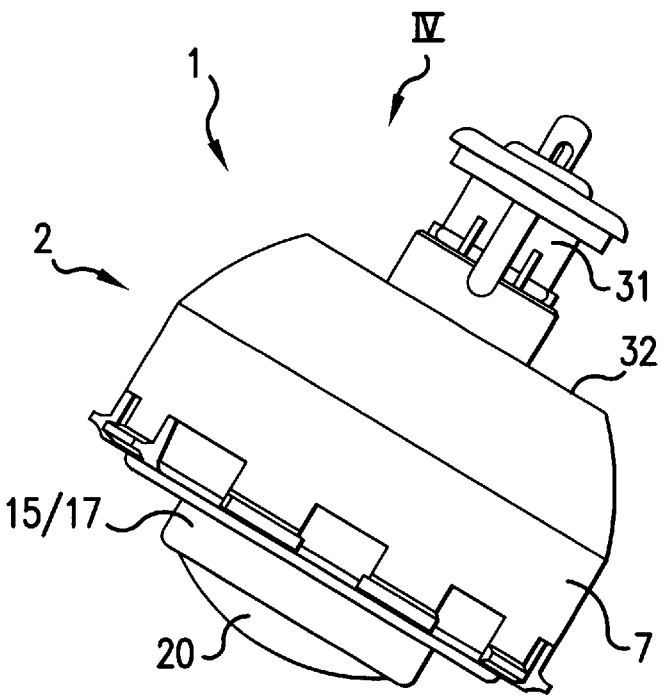
FIG. 3 illustrates an exterior side view of a reading light according to the present invention.
Figure 4:
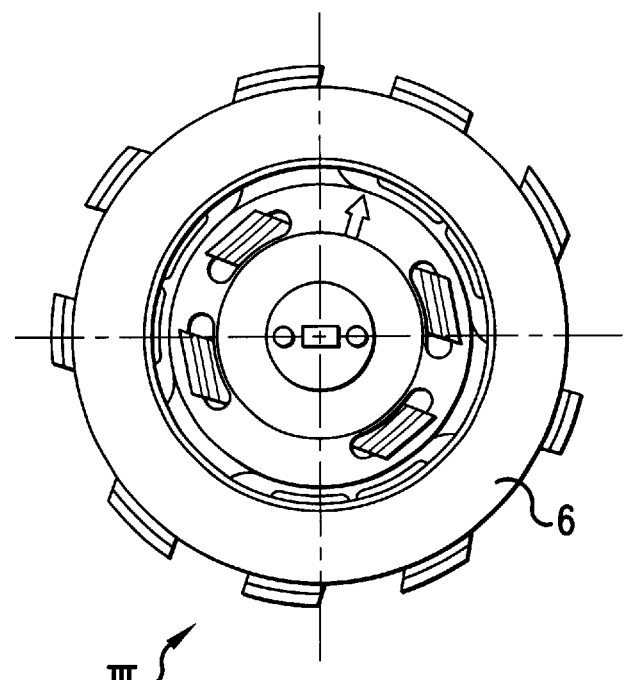
FIG. 4 illustrates an exterior rear view of the reading light illustrated in FIG. 3 as seen from direction IV.
Figure 6:
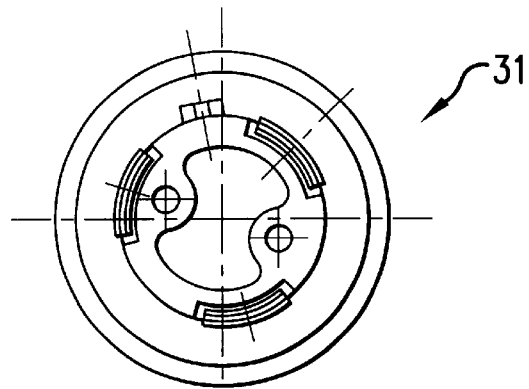
FIG. 6 illustrates a bottom view of the plug illustrated in FIG. 5 as seen from direction VI.
Figure 5:
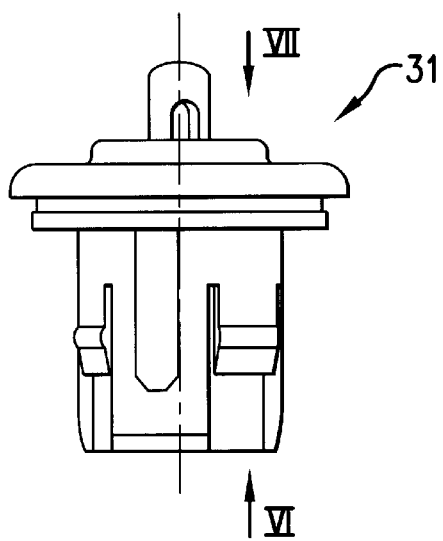
FIG. 5 illustrates a side view of a plug according to the present invention.
Figure 7:
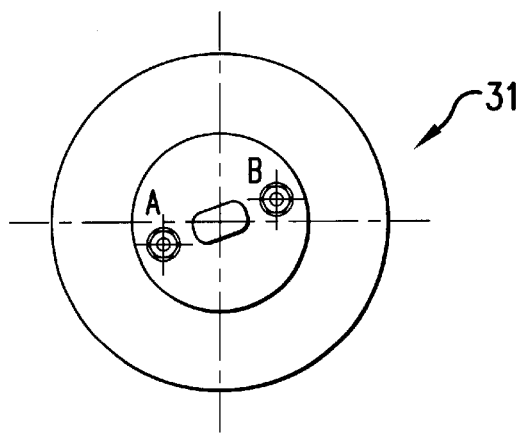
FIG. 7 illustrates a top view of the plug illustrated in FIG. 5 as seen from direction VII.

As is illustrated in FIGS. 1–7, a reading light 1 includes a light fixture housing 2, a light source 3, a first lens 4 and a second lens 5. The light fixture housing 2 has a spherical light fixture body 6, which is pivotally mounted in a shell 7.

The light fixture body 6 has a light source 3 on its rear end 8, the light source 3 is a light-emitting diode 9. A light panel diaphragm 11 is placed in front of the light-emitting diode 9 in the direction 10 of its light emission. A color filter 12 designed as filter ring 13 is arranged coaxially with light-emitting diode 9. The first lens 4 is secured by a lens holder 14 of the light-emitting diode 9, integrally molded on the light fixture body 6, and the filter ring 13. The first lens 4 is designed as a convergent lens, preferably a plano-convex lens with a free-form area whose first focal point $F_1$ is arranged behind the light-emitting diode 9 opposite the direction 10 of emission. However, it is also possible to arrange the light-emitting diode 9 and/or its light panel 11 directly in the first focal point $F_1$.

The light fixture body 6 has a tube 15 whose rear end 16 connects into the lens holder 14, and on whose free end 17, downstream from the first lens 4 facing away from the rear end 16, the second lens 5 is held in a shoulder 18. According to a first embodiment, the second lens 5 is a Fresnel lens 19. According to a second embodiment, the second lens 5 is a biconvex lens 20.

Figure 8:
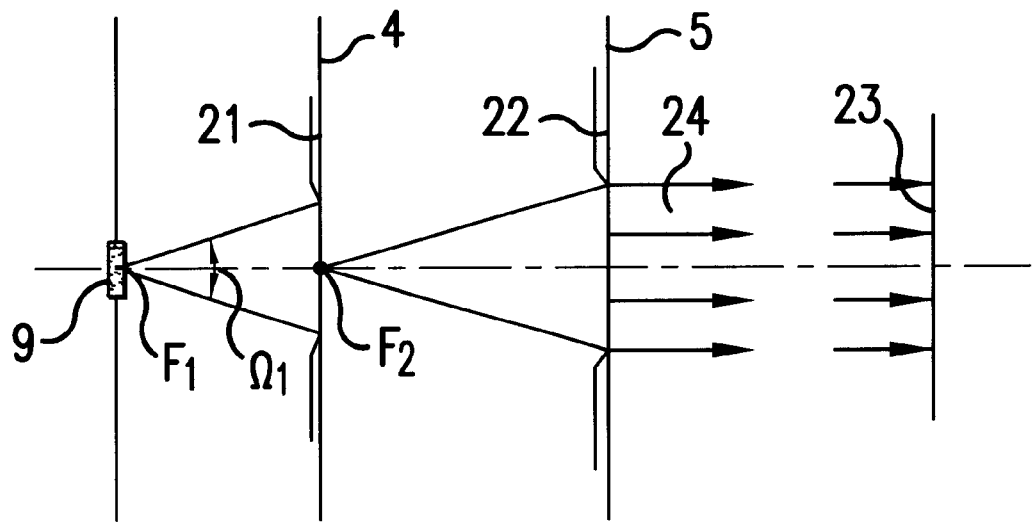
FIG. 8 illustrates a beam path diagram of a reading light according to the present invention with a light-emitting diode at the focal point of the first lens.
Figure 9:
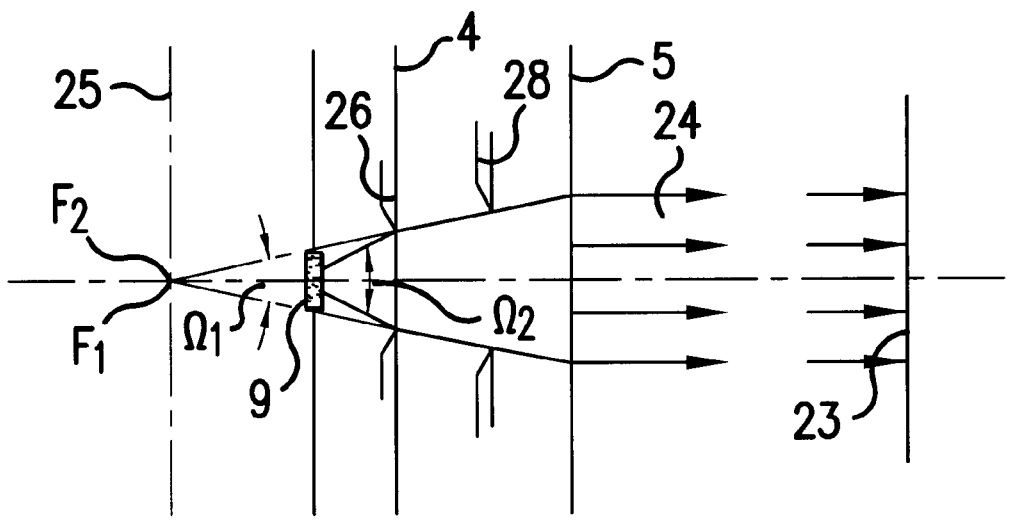
FIG. 9 illustrates a beam path diagram of a reading light according to the present invention with the focal points of first and second lenses being coincident and positioned behind the light-emitting diode.

Referring to FIGS. 8 and 9, because the light-emitting diode 9 is arranged at the focal point $F_1$ of the first lens 4, a beam aperture stop or light panel 21 is positioned in the plane of the first lens 4. As a result, a beam angle width or spreading factor of $\Omega_1$ is formed by the beam aperture stop or light panel 21. The first lens 4 is arranged at a second focal point $F_2$ of the second lens 5. A field aperture stop 22 is positioned in the plane of the second lens 5. An illumination area 23 is thereby illuminated uniformly with parallel light intensity 24 emitted from the dual lens system.

If the focal point $F_1$ of the first lens 4 is arranged behind the light-emitting diode 9, a virtual object plane 25 with a virtual beam angle width or virtual spreading factor $\Omega_1$ is produced. A field aperture stop 26 is formed at the focal point $F_1$ in the plane of the first lens 4. As a result, a real beam angle width or real spreading factor $\Omega_2$ is formed, which is much larger than the virtual beam angle $\Omega_1$. A beam aperture stop or light panel 28 is shifted in the direction of the second lens 5 so that it increases in size, therefore, the light system efficiency is excellent. In particular, when a biconvex lens 20 is used, the light distribution is maximum at the core and decreases toward the edges.

The light-emitting diode 9 has a housing 29 with two pins 30 as electric contacts over which a plug 31 can be placed to provide electrical contact. The plug 31 is designed so that it seals the light fixture housing 2 on its rear side 32 to prevent dust, moisture and the like from entering the lens system. At the same time, the plug 31 forms a twist guard for a cooling body 33 arranged on the rear side 32 of the light fixture housing 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reading light, comprising:

a light source arranged in a housing;

a first lens having a first focal point; and a second lens having a second focal point, wherein said first and second lenses in this order are arranged in front of the light source in the direction of light emission, said first and second focal points being coincident, and wherein said light source comprises at least one light emitting diode and is arranged between the coincident position of said first and second focal points and said first lens in the direction of light emission.

2. The reading light according to claim 1, wherein said light source is a light-emitting diode.

3. The reading light according to claim 1, wherein said first lens is a convergent lens.

4. The reading according to claim 3, wherein the convergent lens is designed as a plano-convex lens with a free-form area.

5. The reading light according to claim 1, wherein said second lens is a Fresnel lens.

6. The reading light according to claim 1, wherein said second lens is a biconvex lens.

7. The reading light according to claim 2, wherein said light-emitting diode has a light-emitting diode housing with two pins being electrical contact points, wherein said two pins are capable of receiving a plug carrying an electrical voltage.

8. The reading light according to claim 7, wherein said plug seals a rear side of the housing.

9. The reading light according to claim 1, wherein the first and second lenses are affixed to said housing so that their positions cannot be adjusted relative to said housing and each other.

10. The reading light according to claim 9, wherein said first and second lenses are the only lenses.

11. The reading light according to claim 1, wherein said first and second lenses are the only lenses.

12. The reading light according to claim 1, wherein the light source is affixed to said hosing so that its position cannot be adjusted relative to said housing and to said first and second lenses.

* * * * *